United States Patent
Hu et al.

(10) Patent No.: US 11,614,596 B2
(45) Date of Patent: Mar. 28, 2023

(54) OPTICAL ELEMENT DRIVING MECHANISM AND OPTICAL ELEMENT DRIVING SYSTEM

(71) Applicant: TDK TAIWAN CORP., Taoyuan (TW)

(72) Inventors: Chao-Chang Hu, Taoyuan (TW);
Mao-Kuo Hsu, Taoyuan (TW);
Hsueh-Ju Lu, Taoyuan (TW);
Chih-Wei Weng, Taoyuan (TW);
Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 370 days.

(21) Appl. No.: 16/778,699

(22) Filed: Jan. 31, 2020

(65) Prior Publication Data

US 2020/0249425 A1    Aug. 6, 2020

Related U.S. Application Data

(60) Provisional application No. 62/799,886, filed on Feb. 1, 2019.

(51) Int. Cl.
| | |
|---|---|
| *G02B 7/08* | (2021.01) |
| *G03B 9/06* | (2021.01) |
| *G03B 30/00* | (2021.01) |
| *G02B 7/09* | (2021.01) |
| *G02B 27/64* | (2006.01) |
| *G03B 13/36* | (2021.01) |
| *G03B 5/06* | (2021.01) |
| *H04N 5/232* | (2006.01) |
| *H04N 5/225* | (2006.01) |

(52) U.S. Cl.
CPC .............. *G02B 7/08* (2013.01); *G03B 9/06* (2013.01); *G02B 7/09* (2013.01); *G02B 27/646* (2013.01); *G03B 5/06* (2013.01); *G03B 13/36* (2013.01); *G03B 30/00* (2021.01); *G03B 2205/0023* (2013.01); *G03B 2205/0069* (2013.01); *H04N 5/2257* (2013.01); *H04N 5/23287* (2013.01)

(58) Field of Classification Search
CPC .......... G02B 7/08; G02B 27/646; G02B 7/09; G02B 7/04; H04N 5/2254; H04N 5/2257; H04N 5/2253; H04N 5/2252; H04N 5/2251; H04N 5/23287; H04N 5/23212; G03B 3/10; G03B 13/36; G03B 5/00; G03B 2205/0069
See application file for complete search history.

(56) References Cited

U.S. PATENT DOCUMENTS

| | | | |
|---|---|---|---|
| 9,134,503 B2 * | 9/2015 | Topliss | G03B 5/00 |
| 9,210,306 B1 * | 12/2015 | Gamadia | H04N 5/2259 |
| 9,247,118 B2 * | 1/2016 | Yamanaka | H04N 5/23216 |
| 9,560,247 B2 * | 1/2017 | Topliss | H04N 5/23258 |
| 9,774,772 B2 * | 9/2017 | Shin | G03B 5/00 |

(Continued)

*Primary Examiner* — Leon W Rhodes, Jr.
(74) *Attorney, Agent, or Firm* — Muncy, Geissler, Olds & Lowe, P.C.

(57) ABSTRACT

An optical element driving mechanism is provided, including a fixed portion, a movable portion, and a driving assembly. The movable portion is movably connected to the fixed portion and includes a holder to hold an optical element having a main axis. The driving assembly is disposed on the movable portion or the fixed portion for driving the movable portion to move relative to the fixed portion.

14 Claims, 9 Drawing Sheets

(56) References Cited

U.S. PATENT DOCUMENTS

| | | | |
|---|---|---|---|
| 9,989,727 B2* | 6/2018 | Shin | H04N 5/2254 |
| 2006/0256209 A1* | 11/2006 | Yoshida | H04N 17/002 |
| | | | 348/E5.045 |
| 2017/0223257 A1* | 8/2017 | Tani | G02B 7/365 |

* cited by examiner

OPTICAL ELEMENT DRIVING MECHANISM AND OPTICAL ELEMENT DRIVING SYSTEM

CROSS REFERENCE TO RELATED APPLICATIONS

This application claims the benefit of U.S. Provisional Application No. 62/799,886, filed on Feb. 01, 2019, the entirety of which are incorporated by reference herein.

BACKGROUND OF THE DISCLOSURE

Field of the Disclosure

The present disclosure relates to an optical element driving mechanism and an optical element driving system.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and better durability. As a result, how to effectively reduce the size of the driving mechanism and how to increase its durability have become important issues.

BRIEF SUMMARY OF DISCLOSURE

An optical element driving mechanism is provided, including a fixed portion, a movable portion, and a driving assembly. The movable portion is movably connected to the fixed portion and includes a holder to hold an optical element having a main axis. The driving assembly is disposed on the movable portion or the fixed portion for driving the movable portion to move relative to the fixed portion.

In some embodiments, the optical element driving mechanism further includes a position sensing assembly and a switch element. The position sensing assembly is disposed on the movable portion or the fixed portion for detecting relative movement between the movable portion and the fixed portion. The switch element is disposed on the fixed portion to switch the optical element driving mechanism between a close-loop mode and an open-loop mode.

In some embodiments of the present disclosure, the movable portion refers to information provided from the position sensing assembly in the close-loop mode, and the movable portion does not refer to the information provided from the position sensing assembly in the open-loop mode. In some embodiments, the optical element driving mechanism further includes a control element disposed on the fixed portion, wherein current is provided to the optical element driving mechanism by the control element based on a target position of the movable portion when the movable portion moving relative to the fixed portion.

In some embodiments, corresponding position information is stored in the control element, and the corresponding position information includes information between the stroke and the code of the holder. In some embodiments, the optical element driving mechanism further includes an adjust element disposed on the fixed portion for providing a compensated angle to the holder to adjust the tilting angle of the holder relative to the main axis. In some embodiments, corresponding tilting information is stored in the adjust element, and the corresponding tilting information records the relationship between the stroke and the compensated angle. In some embodiments, the optical element driving mechanism further includes a processing module disposed on the fixed portion, wherein the switch element, the control element, the adjust element, and the position sensing assembly are at least partially disposed at the processing module.

In some embodiments of the present disclosure, when the optical element driving mechanism is switched to the open-loop mode by the switch element, a fixed current is provided to the optical element driving mechanism by the control element, to maintain the movable portion at the target position. In some embodiments, the fixed current is an average of required current to maintain the holder at the target position. In some embodiments, the movable portion is moved by the adjust element during the open-loop mode, and the movable portion is not moved by the adjust element during the close-loop mode.

In some embodiments, the position sensing assembly includes a position sensing element and a sensed object. The position sensing element is disposed on the fixed portion. The sensed object is disposed on the movable portion, wherein the position sensing element and the sensed object do not overlap with each other when viewed along the main axis. In some embodiments, the position sensing assembly includes a position sensing element and a sensed object. The position sensing element is disposed on the fixed portion. The sensed object is disposed on the movable portion, wherein the position sensing element and the sensed object do not overlap with each other when viewed along a direction that is perpendicular to the main axis. In some embodiments, the optical element driving mechanism further includes an adjust element disposed on the fixed portion, wherein tilting angles of the holder at different positions are gained by images of the holder holding the optical element at the different positions, the tilting angles are combined as tilting angle information, and the tilting angle information is calculated to be corresponding tilting information and is written into the adjust element.

An optical element driving system is provided, including an optical element driving mechanism, an adjust element, and an external device. The adjust element is disposed on the fixed portion. The external device is electrically connected to the optical element driving mechanism to measure tilting angles of the holder at different positions and combining the tilting angles to be tilting angle information, wherein the tilting angle information is calculated to be corresponding tilting information and is written into the adjust element.

In some embodiments, calculating the tilting angle information to be the corresponding tilting information is performed by software. In some embodiments, the optical element driving system further includes an image capturing device, wherein the optical element driving mechanism is dispose in the image capturing device, and the software is built in the image capturing device. In some embodiments, the image capturing device is a mobile device.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
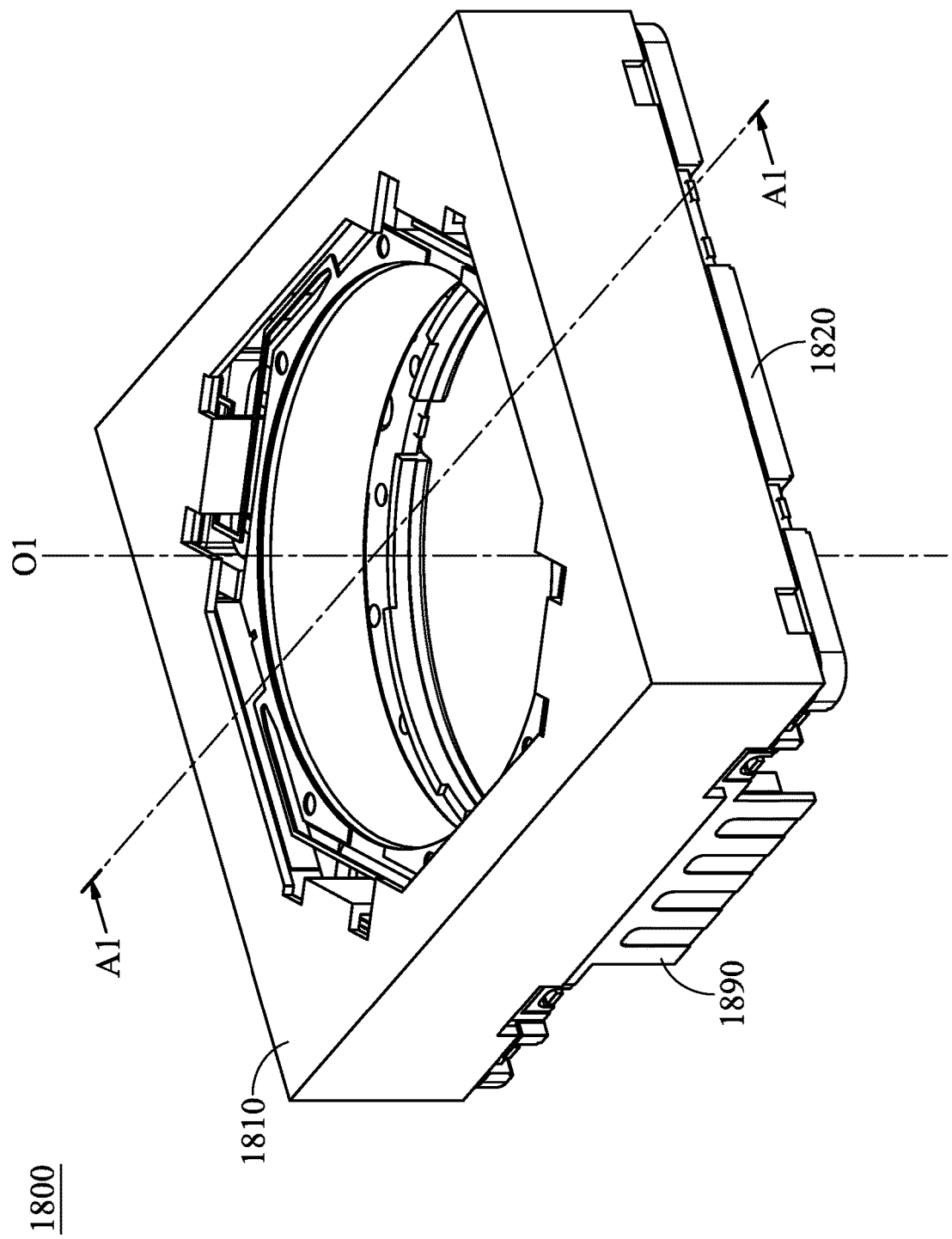
FIG. 1 is a perspective view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact with each other.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
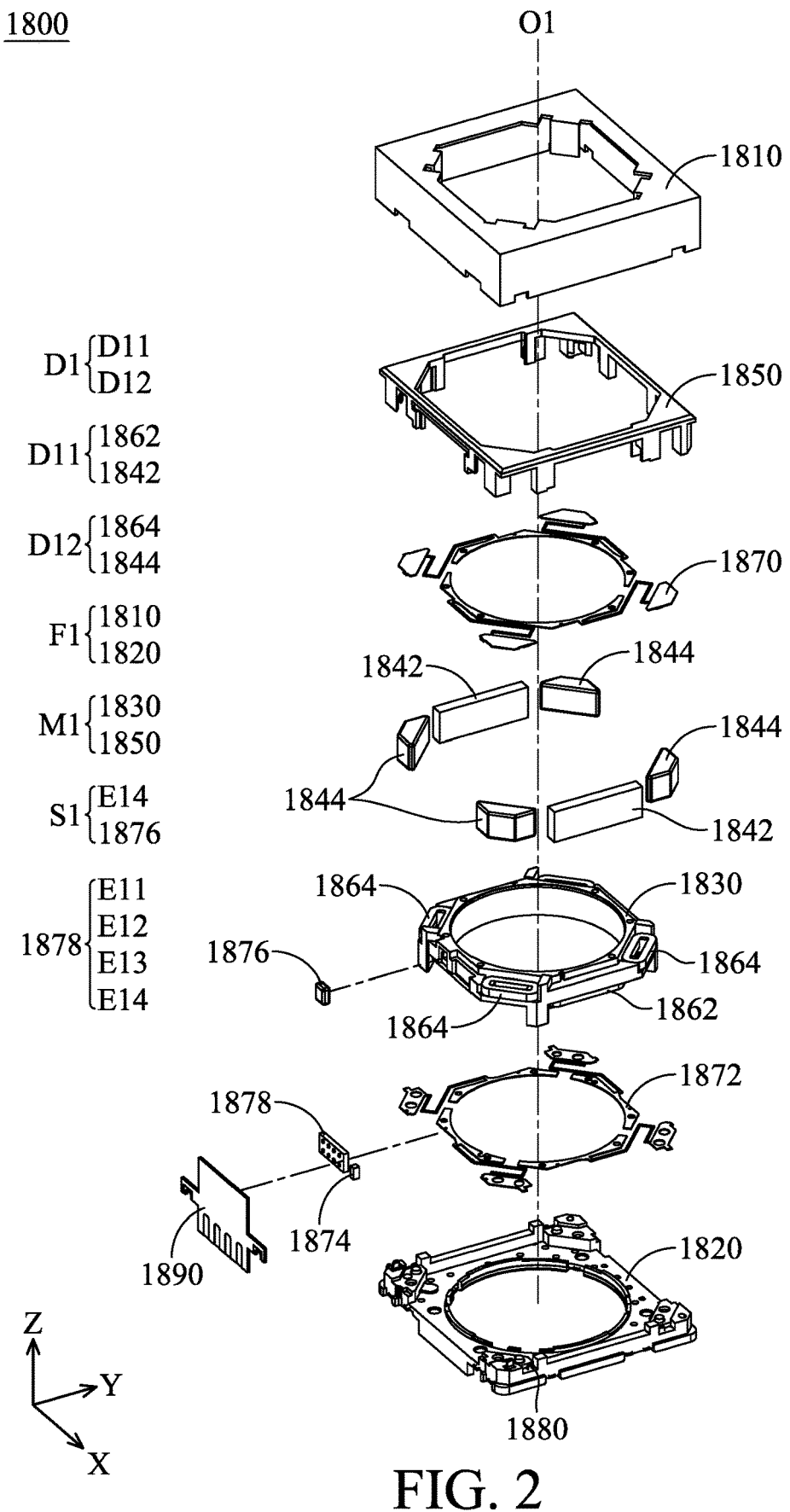
FIG. 2 is an exploded view of the optical element driving mechanism.
Figure 3:
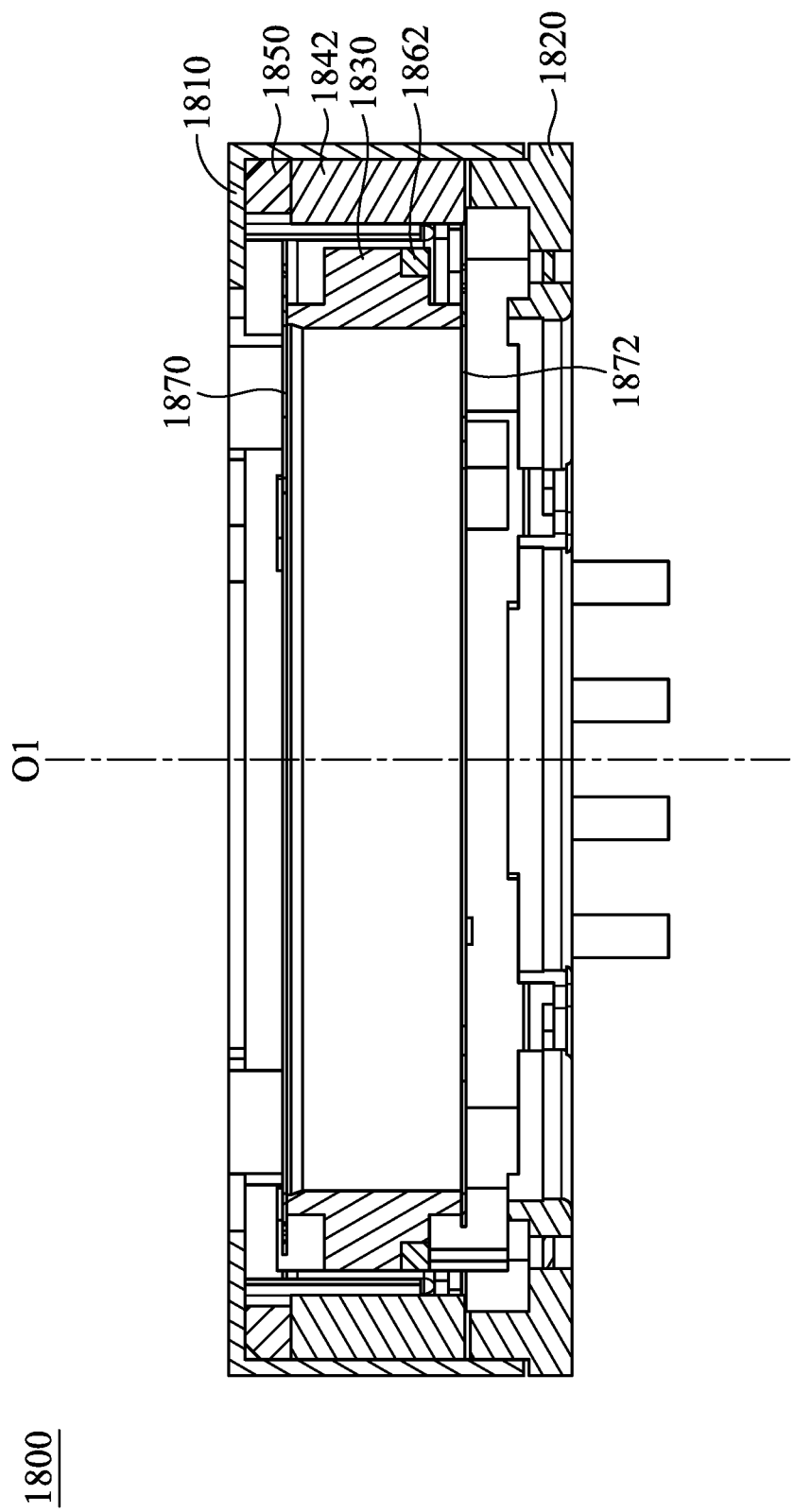
FIG. 3 is a cross-sectional view of the optical element driving mechanism.

FIG. 1 is a perspective view of an optical element driving mechanism 1800 in some embodiments of the present disclosure, FIG. 2 is an exploded view of the optical element driving mechanism 1800, and FIG. 3 is a cross-sectional view illustrated along the line A1-A1 in FIG. 1. In FIG. 1, the optical element driving mechanism 1800 mainly includes a case 1810, a base 1820, a movable portion M1 (which includes a holder 1830 and a frame 1850), a first driving assembly D11 (which includes a first magnetic element 1842 and a second magnetic element 1862), a second driving assembly D12 (which includes a third magnetic element 1844 and a fourth magnetic element 1864), a first resilient element 1870, a second resilient element 1872, a filter element 1874, a sensed object 1876, a processing module 1878, circuit 1880, and a circuit board 1890 arranged in a main axis O1. The optical element driving mechanism 1800 may be used for driving an optical module, or may be used for driving different optical elements, such as a lens, a mirror, a prism, a beam splitter, or an aperture (not shown).

In some embodiments, the case 1810 and the base 1820 may be combined to form the outer case of the optical element driving mechanism 1800. Furthermore, the case 1810 and the base 1820 may be called as a fixed portion F1. It should be noted that a case opening and a base opening may be formed on the case 1810 and the base 1820, respectively. The center of the case opening corresponds to the main axis O1 of the optical element, and the base opening corresponds to an image sensor (not shown) outside the optical element driving mechanism 1800. As a result, the optical element disposed in the optical element driving mechanism 1800 may perform focusing with the image sensor in the main axis O1.

The holder 1830 has a through hole, and the optical element may be affixed in the through hole, such by securing or gluing. The frame 1850 is disposed between the case 1810 and the base 1820, and the holder 1830 may be disposed in the frame 1850. The first magnetic element 1842 may be, for example, a driving magnet, and may be disposed at the sides of the optical element driving mechanism 1800. The second magnetic element 1862 may be, for example, a driving coil, which may be wounded on the outer surface of the holder 1830. The third magnetic element 1844 may be, for example, a driving magnet, and may be disposed at the corners of the optical element driving mechanism 1800. The fourth magnetic element 1864 may be, for example, a driving coil, and may be disposed at the corners of the holder 1830. The first magnetic element 1842 may correspond to the second magnetic element 1862, and the third magnetic element 1844 may correspond to the fourth magnetic element 1864.

Magnetic forces may be generated by the interaction between the first magnetic element 1842 and the second magnetic element 1862, and the interaction between the third magnetic element 1844 and the fourth magnetic element 1864, to move the holder 1830 relative to the fixed portion F1. For example, the interaction between the first magnetic element 1842 and the second magnetic element 1862 may move the holder 1830 in the main axis O1, and the interaction between the third magnetic element 1844 and the fourth magnetic element 1864 may change the tilting angle of the holder 1830 relative to the fixed portion F1.

In this embodiment, the holder 1830 and the optical element disposed therein is movably disposed in the frame 1850. Specifically, the holder 1830 may be connected to frame 1850 and suspended in the frame 1850 by the first resilient element 1870 and the second resilient element 1872 formed from metal (FIG. 3).

The first driving assembly D11 and the second driving assembly D12 may be referred to as a driving assembly D1. When current is applied to the second magnetic element 1862 or the fourth magnetic element 1864, the second magnetic element 1862 or the fourth magnetic element 1864 interact with the magnetic fields of the first magnetic element 1842 or the third magnetic element 1844, respectively. Afterwards, an electromagnetic force is generated to move the holder 1830 and the optical element relative to the fixed portion F1. For example, the first magnetic element 1842 and the third magnetic element 1844 may include at least one multipole magnet to perform magnetic interaction with the second magnetic element 1862 and the fourth magnetic element 1864, respectively, so the holder 1830 and the optical element may be moved relative to the fixed portion F1.

The position sensor E14 may be disposed on the fixed portion F1 (such as disposed in the processing module 1878) to detect the position of the movable portion M1 (such as the holder 1830) relative to the fixed portion F1. For example, the position sensor E14 may detect the position of the sensed object 1876 (such as a magnet) disposed on the holder 1830 to get the position of the holder 1830. The position sensor E14 may include a Hall effect sensor, a magnetoresistance effect sensor (MR sensor), a giant magnetoresistance effect sensor (GMR sensor), a tunneling magnetoresistance effect sensor (TMR sensor), or a fluxgate sensor. The position sensor E14 (the processing module 1878) and the sensed object 1876 do not overlap with each other when viewed along the main axis O1. The position sensor E14 and the sensed object 1876 do not overlap each other when viewed in a direction that is perpendicular to the main axis O1.

The processing module 1878 may include, for example, an integrated circuit (IC) element, which may include an adjust element E11, a switch element E12, a control element E13, and the position sensor E14 disposed therein, to control the movement of the optical element driving mechanism 1800. In some embodiments, the position sensor E14 and the processing module 1878 may be integrated as one piece to reduce the amount of the required elements of the optical element driving mechanism 1800. The adjust element E11 may adjust the tilting angle of the holder 180 relative to the main axis O1. The switch element E12 may switch the optical element driving mechanism 1800 in a close-loop mode and an open-loop mode. During the close-loop mode, the movable portion M1 is moved based on the information provided by the position sensor E14. During the open-loop mode, the movable portion M1 is not moved based on the information provided by the position sensor E14. The control element E13 may control the optical element driving mechanism 1800 to input current corresponding to a target position of the movable portion M1 when the movable portion M1 is moving relative to the fixed portion F1. The filter element 1874 may include elements such as a capacitor for filtering the noise in the signal provided to the processing module.

In this embodiment, circuit 1880 may be disposed on the base 1820, such as be formed on or formed in the base 1820 by insert molding or molded interconnect object technology, such as laser direct structuring (LDS), microscopic integrated processing technology (MIPTEC), laser induced metallization (LIM), laser restructuring print (LRP), aerosol jet process, or two-shot molding method, etc.

The circuit board 1890 may be, for example, a flexible printed circuit board (PCB), which may be affixed on the fixed portion F1. In this embodiment, the circuit board 1890 is electrically connected to a driving unit (not shown) outside the optical element driving mechanism 1800 for performing auto focus (AF) or optical image stabilization (OIS).

It should be noted that electric signal may be provided to the circuit 1880 on the base 1820 from the circuit board 1890, and may be provided to the second driving assembly D12 from the circuit board 1890 through the first resilient element 1870 to control the movement of the holder 1830.

Figure 4:
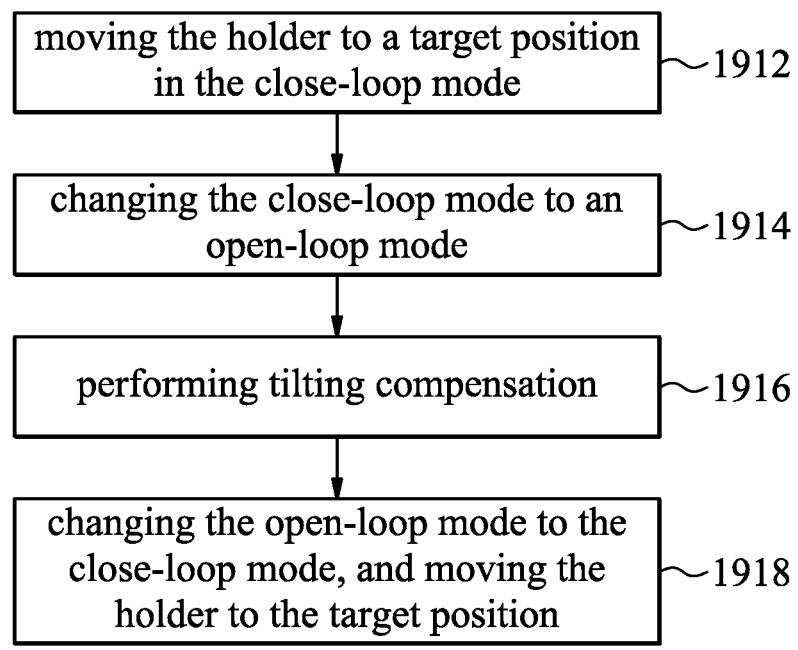
FIG. 4 is a block diagram of a compensation method of the optical element driving mechanism.

FIG. 4 is a block diagram of a compensation method 1910 in some embodiments of the present disclosure, wherein the compensation method 1910 sequentially includes a first step 1912, a second step 1914, a third step 1916, and a fourth step 1918. FIG. 5 to FIG. 8 are schematic views showing the relationship between the holder 1830 and the fixed portion F1 when performing the compensation method 1910. The tilting of the holder 1830 during its movement, such as during auto focus, may be compensated by the compensation method 1910.

Figure 5:
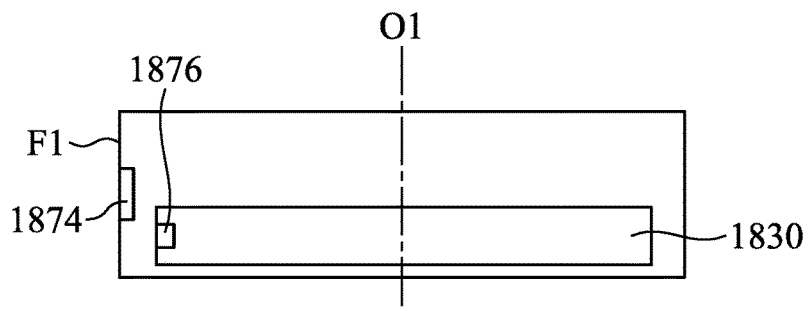
FIG. 5 to FIG. 8 are schematic views showing the relationship between the holder and the fixed portion when performing the compensation method.
Figure 6:
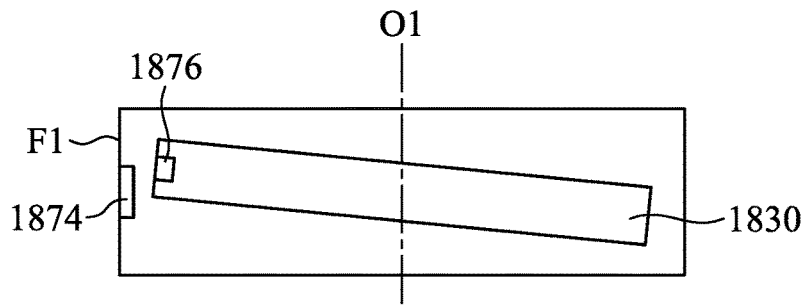

In the first step 1912, the optical element driving mechanism 1800 is at a close-loop mode. In other words, the position of the holder 1830 is controlled by signal feedback from a position sensing assembly S1 (which includes the position sensor E14 and the sensed object 1876). As a result, as shown in FIG. 5 and FIG. 6, the holder 1830 may be moved to a target position along the main axis O1.

Afterwards, using the control element E13 in the processing module 1878 and referring to corresponding position information, to input corresponding current into the optical element driving mechanism 1800 based on the target position. The corresponding position information includes information between the stroke and the code of the holder 1830.

Afterwards, in the second step 1814, the optical element driving mechanism 1800 is changed to an open-loop mode from the close-loop mode by the switch element E12 in the processing module 1878, and the holder 1830 is maintained in a target position. It should be noted that the position of the holder 1830 is not controlled by the position sensing assembly S1, but is controlled by the control element E13 at this time. In particular, the current provided to the optical element driving mechanism 1800 is maintained at a fixed current gained in the first step 1912, so the holder 1830 may be maintained at the target position.

It should be noted that the fixed current is an average current to maintain the holder 1830 at this target position. In other words, the fixed current is the average current provided to the optical element driving mechanism 1800 when the holder 1830 is stable. The relative position of the holder 1830 to the fixed portion F1 is shown in FIG. 6. When comparing to FIG. 5, the holder 1830 is moved to the target position, and the angle between the holder 1830 and the main axis O1 is changed.

Next, in the third step 1916, the tilting angle of the holder 1830 relative to the fixed portion F1 is adjusted by the adjust element E11 in the processing module 1878 to allow the holder 1830 being aligned with the main axis O1. For example, electrical signal may be provided from the adjust element E11 to the second driving assembly D12 to adjust the angle of rotation of the holder 1830. The adjust element E11 organizes the corresponding information, which records the relationship between the stroke and the compensated angle of the holder 1830, to create tilting angle information, and the tilting angle information is calculated to be corresponding tilting information. The corresponding tilting information is stored into the adjust element E11 to adjust the tilting angle of the holder 1830 based on the target position, so the tilting caused from the movement in previous steps may be compensated. It should be noted that the holder 1830 is moved by the adjust element E11 in the open-loop mode.

Figure 7:
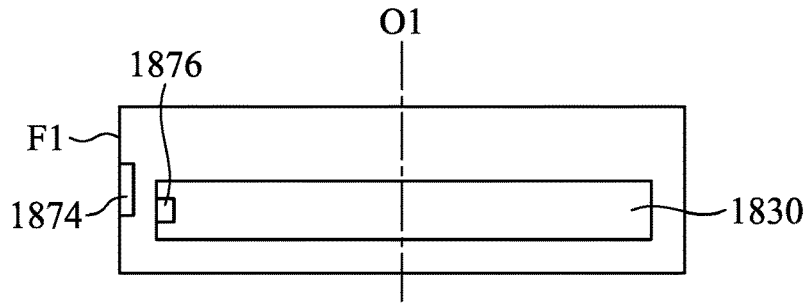

After the tilting angle of the holder 1830 is adjusted by the adjust element E11, the control element E13 refers to the corresponding position to determine the position of the holder 1830. The position of the holder 1830 relative to the fixed portion F1 is shown in FIG. 7. It should be noted that the optical element driving mechanism 1800 is at the open-loop mode now. In other words, the position of the holder 1830 relative to the fixed portion F1 is not controlled by the position sensing assembly S1, so the holder 1830 may move relative to the fixed portion rather than being restricted by the sensing assembly S1 and the close-loop mode.

Figure 8:
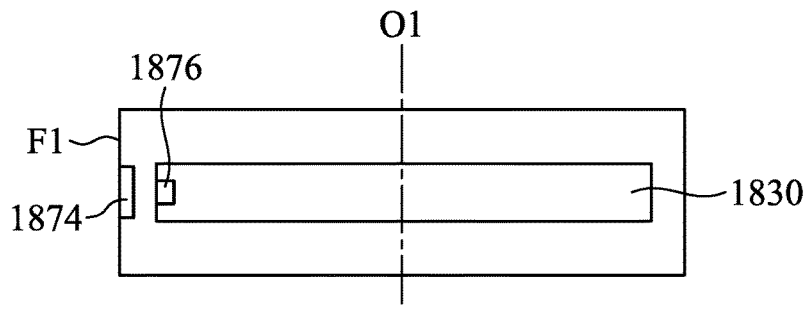

Afterwards, in the fourth step 1918, the optical element driving mechanism 1800 is changed from the open-loop mode to the close-loop mode by the switch element E12, and the holder 1830 is maintained at the target position. The position of the holder 1830 relative to the fixed portion F1 is shown in FIG. 7 or FIG. 8. In some embodiments, the holder 1830 may deviate from the target position along the main axis O1 when compensating the tilting of the holder 1830 in the third step 1916, as shown in FIG. 7. As a result, the fourth step 1918 may also include an operation to move the holder 1830 to a new target position. As shown in FIG. 7 and FIG. 8, wherein the holder 1830 is moved to the new target position along the main axis O1.

Figure 9:
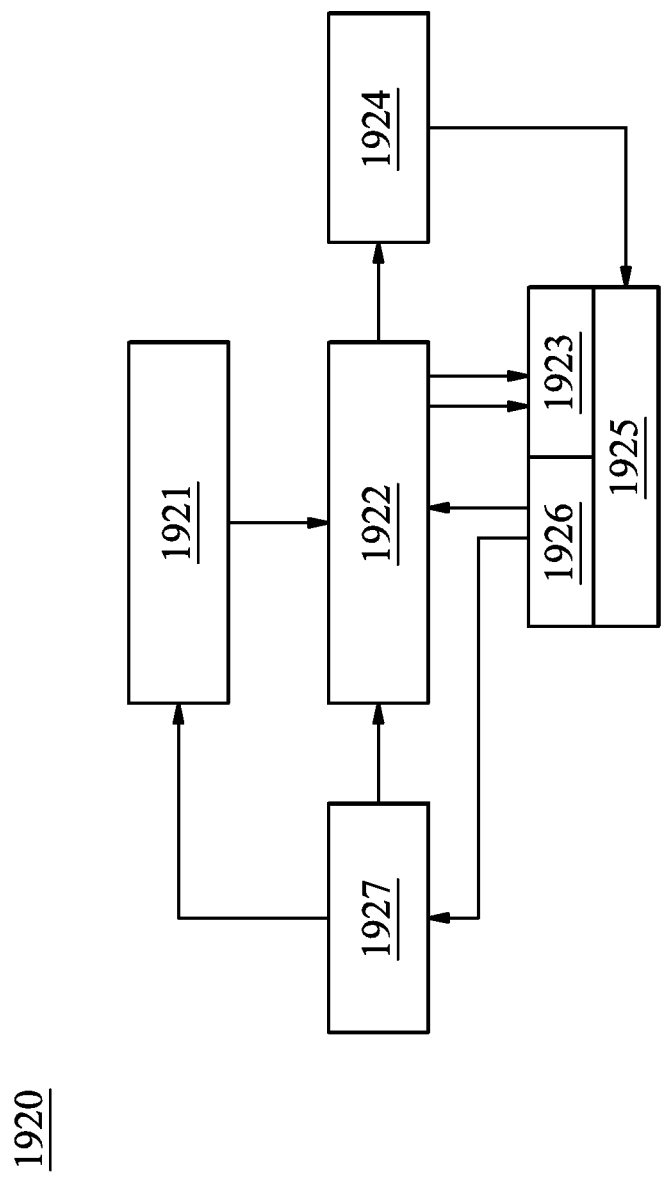
FIG. 9 is a block diagram of control architecture in some embodiments of the present disclosure.

FIG. 9 is a block diagram of control architecture 1920 of the optical element driving mechanism 1800. Corresponding tilting information is stored in an adjust element 1921 (such as the adjust element E11), and the corresponding tilting information may be provided to a control element 1922 (such as the control element E13), so the amount of movement of the holder 1830 may be calculated by the corresponding tilting information and may be calculated by corresponding position information stored in the control element 1922.

The calculated amount of movement of the holder 1830 is transformed to electrical signal by the control element 1922, and the electric signal is provided to a first driving unit 1923 and a second driving unit 1924 to allow the driving assembly 1925 moving the holder 1830 along the main axis O1, and to tilt the holder 1830 relative to the main axis, by the driving assembly 1925. Afterwards, the position of the holder 1830 (such as including the position in the main axis O1 and the tilting relative to the main axis O1) may be detected by a position sensing assembly 1926 disposed on the driving assembly 1925, and the position information is provided to the control element 1922 to perform close-loop control to the position of the holder 1830.

Figure 10:
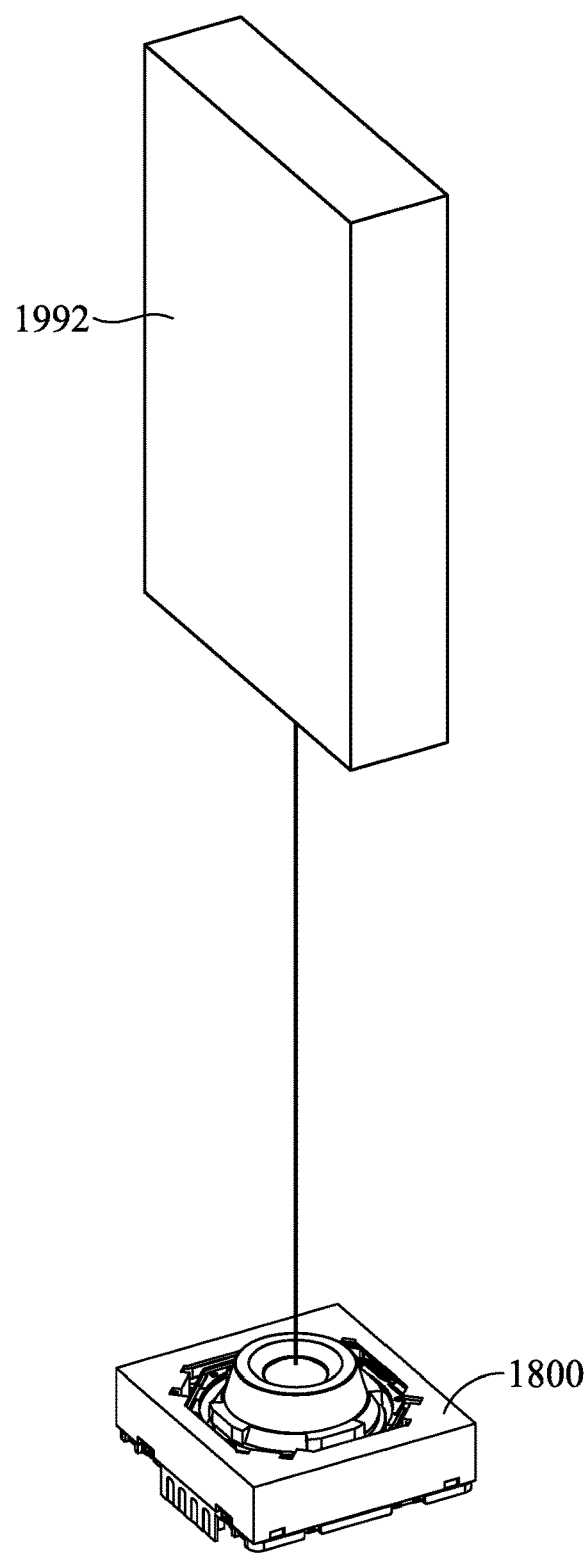
FIG. 10 is a schematic view of an optical element driving mechanism in some embodiments of the present disclosure.
Figure 11:
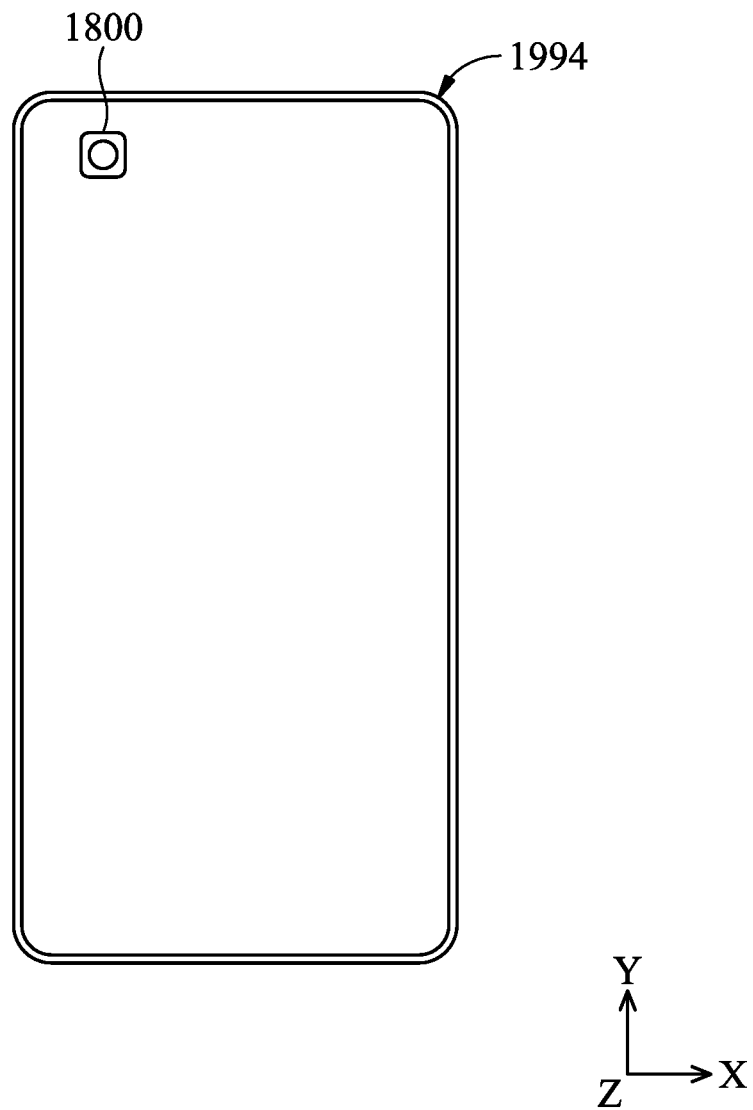
FIG. 11 is a schematic view of an image capturing device in some embodiments of the present disclosure.

In some embodiments, if the optical element driving mechanism 1800 requires being further calibrated, such as when facing excess impact, the compensation method 1910 may further include a zero step of using an external device to perform calibration. FIG. 10 is a schematic view of an optical element driving system 1990. The optical element driving system 1990 has an external device 1992 for measuring the tilting angles of the holder 1830 at different positions, and then the data is organized as tilting angle information. In operation 1927, the tilting angle information is calculated to get corresponding tilting information. The corresponding tilting information is thus written into the adjust element 1921 to replace the corresponding tilting information before calibration. The external device 1992 may be, for example, a collimator. In some embodiments, the operation of converting the tilting angle information to the corresponding tilting information in the operation 1927 is performed by software. In some embodiments, as shown in FIG. 11, the optical element driving mechanism 1800 is disposed in an image capturing device 1994, such as a mobile device like a cell phone, and the software is the built-in software of the image capturing device 1994.

Figure 12:
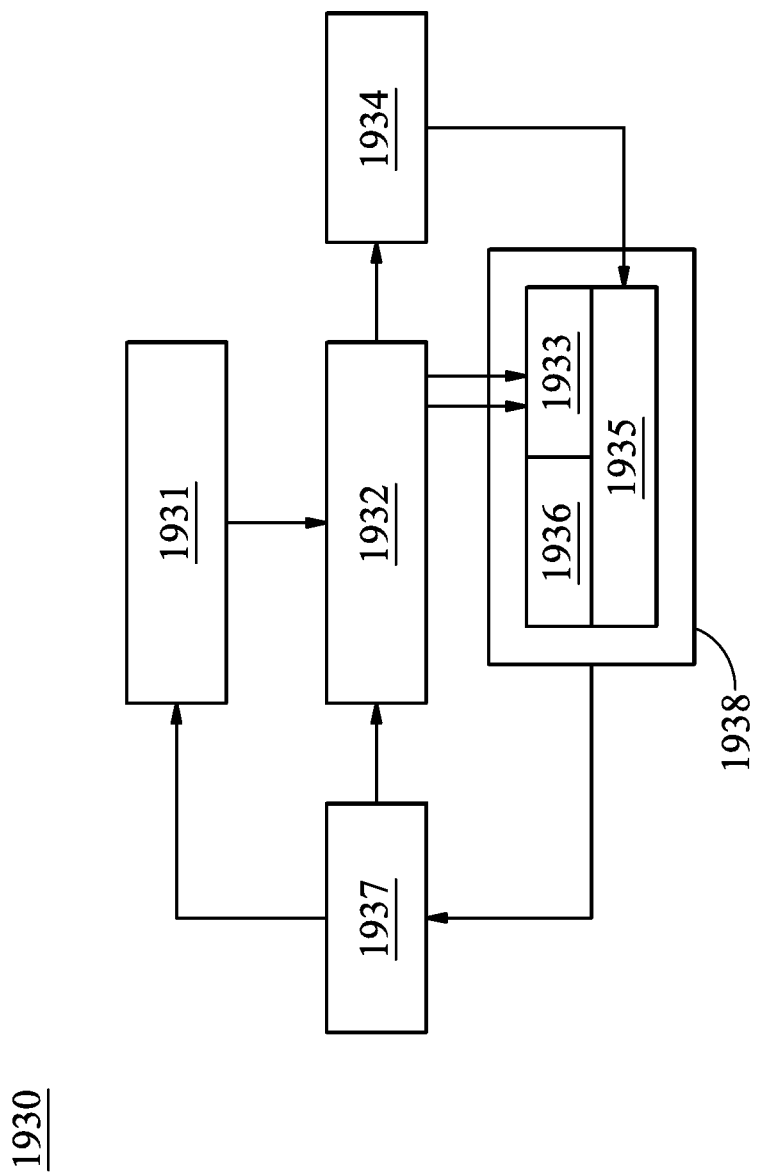
FIG. 12 is a block diagram of control architecture.

FIG. 12 is a block diagram of control architecture 1930 of the optical element driving mechanism 1800. Corresponding tilting information is stored in an adjust element 1931 (such as the adjust element E11), and the corresponding tilting information may be provided to a control element 1932 (such as the control element E13), so the amount of movement of the holder 1830 may be calculated by the corresponding tilting information and corresponding position information stored in the control element 1932.

It should be noted that the corresponding tilting information of the control architecture 1920 may be gained according to the signal provided from the position sensing assembly S1 and the signal provided from the tilting of the holder 1830. However, in the control architecture 1930, the corresponding tilting information in the adjust element 1931 may be achieved by comparing an image captured by the optical element (not shown) in the optical element driving mechanism 1800 to a predetermined image. The comparing method may include spatial frequency response (SFR) method or modulation transfer function (MTF) method.

The calculated amount of movement of the holder 1830 is transformed to electrical signal by the control element 1932, and the electric signal is provided to a first driving unit 1933 and a second driving unit 1934 to allow the driving assembly 1935 moving the holder 1830 along the main axis O1, and to tilt the holder 1830 relative to the main axis, by the driving assembly 1935. Afterwards, the position of the holder 1830 (such as including the position in the main axis O1 and the tilting relative to the main axis O1) may be detected by a position sensing assembly 1936 disposed on the driving assembly 1935, and the position information is provided to the control element 1932 to perform close-loop control to the position of the holder 1830.

In some embodiments, if the optical element driving mechanism 1800 requires being further calibrated, such as when facing excess impact, the compensation method 1910 may further include a zero step of using an external device to perform calibration. FIG. 10 is a schematic view of an optical element driving system 1990. The optical element driving system 1990 has an external device 1992 for measuring the tilting angle of the holder 1830 at different positions, and then the data is organized as tilting angle information. In operation 1937, the tilting angle information is calculated to get corresponding tilting information. The corresponding tilting information is thus written into the adjust element 1931 to replace the corresponding tilting information before calibration. The external device 1992 may be, for example, a collimator. In some embodiments, the operation of converting the tilting angle information to the corresponding tilting information in the operation 1937 is performed by software. In some embodiments, as shown in FIG. 11, the optical element driving mechanism 1800 is disposed in an image capturing device 1994, such as a mobile device like a cell phone, and the software is the built-in software of the image capturing device 1994.

Furthermore, as shown in FIG. 12, the first driving unit 1933, the driving assembly 1935, and the position sensing assembly 1936 may be packaged as one piece, such as a processing module 1938, to reduce the number of the elements in the optical element driving mechanism 1800, so the process may be simplified.

In summary, an optical element driving mechanism is provided, including a fixed portion, a movable portion, a driving assembly, and a switch element. The movable portion is movably connected to the fixed portion and includes a holder to hold an optical element having a main axis. The driving assembly is disposed on the movable portion or the fixed portion for driving the movable portion to move relative to the fixed portion. The switch element is disposed on the fixed portion to switch the optical element driving mechanism between a close-loop mode and an open-loop mode. The movable portion refers to information provided from the position sensing assembly in the close-loop mode, and the movable portion does not refer to the information provided from the position sensing assembly in the open-loop mode. As a result, the tilting caused from the operation of the optical element driving mechanism may be compensated.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed portion;
   a movable portion movably connected to the fixed portion and comprises a holder to hold an optical element having a main axis;
   a driving assembly disposed on the movable portion or the fixed portion for driving the movable portion to move relative to the fixed portion;
   a control element disposed on the fixed portion, wherein corresponding position information is stored in the control element, and the corresponding position information comprises information between a stroke and a code of the holder;
   a position sensing assembly disposed on the movable portion or the fixed portion for detecting relative movement between the movable portion and the fixed portion; and
   a switch element disposed on the fixed portion to switch the optical element driving mechanism between a close-loop mode and an open-loop mode;
   wherein the driving of the movable portion refers to information provided from the position sensing assembly in the close-loop mode, and the driving of the movable portion does not refer to the information provided from the position sensing assembly in the open-loop mode;
   wherein current is provided to the optical element driving mechanism by the control element based on a target position of the movable portion when moving the movable portion relative to the fixed portion.

2. The optical element driving mechanism as claimed in claim 1, further comprising an adjust element disposed on the fixed portion for providing a compensated angle to the holder to adjust the tilting angle of the holder relative to the main axis.

3. The optical element driving mechanism as claimed in claim 2, wherein corresponding tilting information is stored in the adjust element, and the corresponding tilting information records the relationship between the stroke and the compensated angle.

4. The optical element driving mechanism as claimed in claim 2, further comprising a processing module disposed on the fixed portion, wherein the switch element, the control element, the adjust element, and the position sensing assembly are at least partially disposed at the processing module.

5. The optical element driving mechanism as claimed in claim 2, wherein the movable portion is moved by the adjust element during the open-loop mode, and the movable portion is not moved by the adjust element during the close-loop mode.

6. The optical element driving mechanism as claimed in claim 1, when the optical element driving mechanism is switched to the open-loop mode by the switch element, a fixed current is provided to the optical element driving mechanism by the control element, to maintain the movable portion at the target position.

7. The optical element driving mechanism as claimed in claim 6, wherein the fixed current is an average of required current to maintain the holder at the target position.

8. The optical element driving mechanism as claimed in claim 1, wherein the position sensing assembly comprises:
   a position sensing element disposed on the fixed portion; and
   a sensed object disposed on the movable portion, wherein the position sensing element and the sensed object do not overlap with each other when viewed along the main axis.

9. The optical element driving mechanism as claimed in claim 1, wherein the position sensing assembly comprises:
   a position sensing element disposed on the fixed portion; and
   a sensed object disposed on the movable portion, wherein the position sensing element and the sensed object do not overlap with each other when viewed along a direction that is perpendicular to the main axis.

10. The optical element driving mechanism as claimed in claim 1, further comprising an adjust element disposed on the fixed portion, wherein tilting angles of the holder at different positions are gained by images of the holder holding the optical element at the different positions, the tilting angles are combined as tilting angle information, and the tilting angle information is calculated to be corresponding tilting information and is written into the adjust element.

11. An optical element driving system, comprising:
- the optical element driving mechanism as claimed in claim 1;
- an adjust element disposed on the fixed portion; and
- an external device electrically connected to the optical element driving mechanism to measure tilting angles of the holder at different positions and combining the tilting angles to be tilting angle information, wherein the tilting angle information is calculated to be corresponding tilting information and is written into the adjust element.

12. The optical element driving system as claimed in claim 11, wherein calculating the tilting angle information to be the corresponding tilting information is performed by software.

13. The optical element driving system as claimed in claim 12, further comprises an image capturing device, wherein the optical element driving mechanism is dispose in the image capturing device, and the software is built in the image capturing device.

14. The optical element driving system as claimed in claim 13, wherein the image capturing device is a mobile device.

\* \* \* \* \*